UNITED STATES PATENT OFFICE.

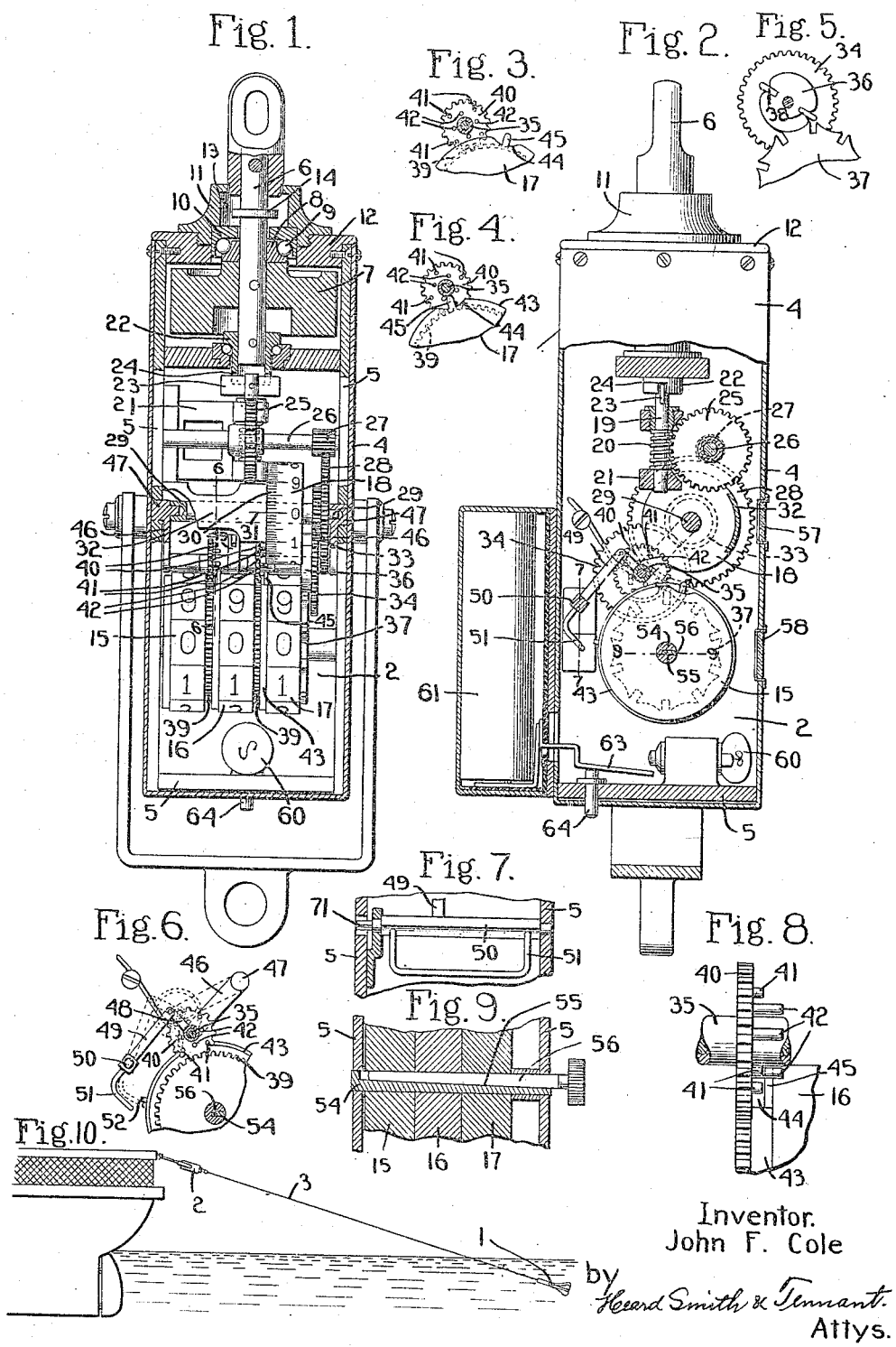

JOHN F. COLE, OF SOMERVILLE, MASSACHUSETTS.

SHIP'S LOG.

1,293,343.  Specification of Letters Patent.  Patented Feb. 4, 1919.

Application filed November 20, 1916. Serial No. 132,293.

*To all whom it may concern:*

Be it known that I, JOHN F. COLE, a citizen of the United States, residing at Somerville, county of Middlesex, State of Massachusetts, have invented an Improvement in Ships' Logs, of which the following description, in connection with the accompanying drawing, is a specification, like characters on the drawing representing like parts.

This invention relates to ships' logs and has for its object to provide a novel log which is constructed to indicate both the speed of the ship and the distance traveled in nautical miles, which is provided with means for illuminating the indicating dials so that the reading can be readily made in the dark, which is constructed so that it will operate evenly, regardless of slight variations in the operation of the rotor, and which has other features of improvement, all as will be more fully hereinafter set forth.

In order to give an understanding of the invention I have illustrated in the drawings a selected embodiment thereof which will now be described, after which the novel features will be pointed out in the appended claims.

Figure 1 is a longitudinal section through a device embodying my invention;

Fig. 2 is a side view of Fig. 1 with parts shown in section;

Figs. 3 and 4 are detail views of the carrying mechanism;

Fig. 5 is a fragmentary view of the intermittent gearing used for driving the indicating wheels;

Fig. 6 is a section on the line 6—6, Fig. 1;

Fig. 7 is a section on the line 7—7, Fig. 2;

Fig. 8 is a fragmentary detail view of the carrying mechanism;

Fig. 9 is a section on the line 9—9, Fig. 2;

Fig. 10 is a view of the stern of a ship with my improved ship's log applied thereto.

The completed device comprises a rotor 1 of any suitable or usual construction and an indicating element indicated generally at 2 and which is connected to the rotor 1 by the usual cable or connection 3. The novel features of the present invention reside in the indicator element 2. This indicator element comprises a casing 4 in which is received a frame 5 that supports the indicating wheels and the operative parts of the mechanism. Journaled in one end of the casing is a shaft section 6 to which the cable 3 is secured. This shaft section is connected to the indicating wheels, as will be presently described. Said shaft section has fast thereon a fly-wheel element 7 which is located within the frame and which by its momentum serves to steady the operation of the device. Said shaft section is also provided with a thrust bearing to take the pulling strain on the cable 3. As herein shown, the shaft 6 is provided with a cone 8 which rests against balls 9 confined in a cup bearing 10 that is mounted in a cap or bushing 11 screwed into the end 12 of the frame. This cap or bushing is provided with an oil well 13 through which the shaft section 6 extends and for maintaining the shaft properly lubricated, I propose to place loosely on said shaft a lubricating ring 14 which dips into the oil in the oil chamber.

My improved log comprises a set of indicating wheels 15, 16, 17 adapted to indicate the mileage in nautical miles, and another indicating wheel 18 by which the speed of the ship can be determined at any time. These wheels are connected to and operated from the shaft section 6, and while any suitable gearing for transmitting the motion of the shaft section 6 to the wheels may be employed, that herein shown is the construction I prefer. The inner end of the shaft section 6 is connected to a worm shaft 19 having a worm 20 thereon, said shaft being journaled in a bracket or bearing 21 secured to the side of the frame 5. I will preferably provide a flexible connection between the worm shaft 19 and the shaft section 6 so as to prevent any binding of the parts if the two shafts are not in perfect alinement. As herein shown, the shaft section 6 has a bearing sleeve 22 secured to the end thereof and the end of the worm shaft 19 extends into the end of said sleeve. Said worm shaft has fingers 23 extending therefrom that are received in notches 24 formed in the end of the sleeve 22.

The worm 20 meshes with a worm gear 25 which is fast on a shaft 26 journaled in the frame and said shaft has a pinion 27 thereon which meshes with a gear 28 fast on a shaft 29 to which the speed-indicating wheel 18 is rigidly secured. This speed-indicating wheel is graduated, as shown at 30, and coöperating therewith is an index mark 31 formed on a stationary member 32 situated adjacent the wheel 18. The speed-indicating wheel 18 will thus rotate with a speed commensurate with the speed of the rotor which, of course, is commensurate with the speed of the vessel, and the graduations 30 on said speed-indicating wheel are so made that the number of graduations which are carried by the index mark 31 in a predetermined interval of time will give the correct speed in knots per hour. In the particular construction herein illustrated, the graduations are such that the difference between the two readings at the beginning and end of a thirty-six second interval will give the correct speed of the vessel in knots, and to determine the speed of the vessel, therefore, involves merely taking the reading of the speed indicating wheel 18 at the beginning of a thirty-six second interval and then again at the end of said interval and noting the difference between the two readings.

The mileage-indicating wheels 15, 16 and 17 are operated from the shaft 29 and in the particular construction shown, the gearing for operating these wheels is such that the wheel 17 will indicate tenths of nautical miles, while the wheel 15 will indicate the tens and the wheel 16 will indicate the units of the total mileage.

The shaft 29 has fast thereon a pinion 33 which meshes with and drives a gear 34 on shaft 35. The shaft 35 is geared to the indicating wheel 17 by an intermittent lock gearing which is so constructed that the rotative movement of the shaft is communicated intermittently to the indicating wheel 17, and said wheel is locked between its forward movements. While any suitable intermittent gear might be employed for this purpose, I have shown a construction on the order of the familiar Geneva stop movement comprising the two intermeshing elements 36 and 37, the element 36 being fast on the shaft 35 and the element 37 being rigid with the indicating wheel 17. The element 36 is provided with two teeth 38 so that the indicating wheel 18 will be stepped forward one step at each semi rotation of the shaft 35. With this construction the indicating wheel 17 will be locked from movement between successive forward steps thereof, as will be obvious by reference to the drawings and to those who are familiar with this form of intermittent gearing. Some suitable carrying mechanism is provided between the indicating wheels 15, 16 and 17 so that at each rotation of the wheel 17, the wheel 16 will be turned forward one step, while at each rotation of the wheel 16, the wheel 15 will be turned forward one step. The carrying mechanism which I have herein shown is one which not only performs the carrying operation, but also locks the wheels 15 and 16 from movement between such carrying operations. The wheel 16 has rigid therewith gear teeth 39 which mesh with a pinion 40 loosely mounted on the shaft 35. This pinion 40 has a series of alternately-arranged short and long projections 41 and 42 extending laterally therefrom, the short projections being situated nearer the periphery of the wheel than the long projections. The short projections 41 constitute locking projections, they being so situated that normally two of them will engage the peripheral portion 43 of the wheel 17 whereby said wheel 17 will lock the pinion 40 from turning movement. This wheel 17 is cut away, as shown at 44, and projecting from said wheel at this cutaway portion is a pin 45 which is adapted to engage one of the long projections 42 as the wheel 17 rotates. The construction is such that at the time that the carrying pin 45 comes into engagement with the long projection 42 on the pinion 40, the notched portion 44 of said wheel is in line with the active locking projections 41 and thus the pinion 40 is free to be turned by the pin 45. The extent which the pinion is turned by the pin 45 is just sufficient to advance the wheel 16 one step forward. As soon as the pin 45 has been carried out of engagement with the long pin 42, the pinion 40 will become locked again by two short projections 41 coöperating with the portion 43 and thus the wheel 16 is locked from rotation. A similar mechanism is employed for moving the indicating wheel 15 forward one step at each rotation of the indicating wheel 16 and for locking the wheel 15 from movement at intermediate stages. The mechanism for operating the indicating wheels is, therefore, one which not only gives them their proper forward movement, but also locks them from any movement except that derived from the driving mechanism.

It is frequently desirable to set the indicating wheels to zero and I have herein provided a construction by which the indicating wheels may be unlocked and then set to zero. This is herein accomplished by providing means for disconnecting the pinions 40 from the indicating wheels, thus allowing said wheels to be freely rotated and at the same time throwing into operative position a stop member by which the rotation of the wheels is arrested when they are brought to zero position.

For thus disconnecting the pinions 40 from the indicating wheels I have mounted the shaft 35 so that it can be swung toward and from the indicating wheels, this being accomplished by journaling said shaft in swinging arms 46 which are pivotally mounted in the frame 5 co-axially with the shaft 29. These arms 46 are shown as provided with trunnions or hubs 47 which are journaled in the frame 5, and the ends of the shaft 29 are journaled in said hubs. The shaft 35 has pivotally connected thereto an arm 48 which in turn is pivotally connected to an arm 49 rigid with a rock-shaft 50. This rock shaft is journaled in the frame and is provided with a squared end 71 that is accessible through the side of the casing 4 and to which a key or other implement can be applied. When this is done the rock shaft can be turned thereby operating through the arms 49 and 48 to move the shaft 35 away from the indicating wheels, thus carrying the pinions 40 out of mesh with said wheels. The rock shaft 50 has a stop bar 51 rigid therewith, said stop bar being so arranged and constructed that when the rock shaft is turned to disconnect the pinion 40 from the indicating wheels the stop bar will be brought into engagement with the periphery of said wheels. Each of said wheels has a stop projection 52 extending radially therefrom and which serves to arrest said wheels at the zero position when they are to be set. The construction is such that when the pinions 40 are in mesh with the indicating wheels the stop bar 51 is situated out of the path of movement of the stop pins 52, but when the rock shaft 50 is turned to disconnect the pinions 40 from the indicating wheels, then the stop bar 51 will be brought into the path of movement of the stop pins 52.

For setting the wheels 15, 16 and 17 to zero when the pinions 40 are disconnected therefrom, I propose to provide the shaft 54 on which said indicating wheels are mounted with a tapered slot 55 and to employ a tapered key 56 adapted to fit said slot which can be inserted thereinto from one end. When the key is thus inserted into the slot, it will have sufficient frictional engagement with the indicating wheels to cause them to turn until they are arrested by the engagement of the stop pins 52 with the stop bar 51. The frictional engagement between the key and each wheel is only sufficient to rotate the wheels when they are disconnected from the pinions and when any wheel has been brought to zero position the key will slip relative to said wheel while carrying the other wheels to zero position.

The operation of setting the indicating wheels to zero, therefore, involves merely turning the rock shaft 50 to disconnect the pinions 40 from the indicating wheels and to throw the stop bar 51 into operative position and then introducing the key 56 into the slot 55 and then turning said key to bring the wheels to zero position.

The casing 4 is provided with sight openings 57, 58 through which the indicating wheels 15, 16, 17 and 18 are visible.

In order to enable the reading to be readily taken in the dark, I propose to provide means for illuminating the interior of the casing. This is herein provided for by an electric lamp 60 which is operated from a dry cell battery 61 secured to the casing. The lamp circuit is closed by a switch 63 which can be operated by the push button 64.

I claim:

1. In a ship's log, the combination with a casing, of a shaft section journaled therein, a mileage indicator comprising a plurality of axially-alined mileage-indicating wheels journaled in the casing, one wheel indicating units, another tens, and another hundreds of the total mileage, gearing connecting said shaft section with the units indicating wheel, said gearing comprising an element which is positively geared to said shaft section and another element connected to the units indicating wheel and intermittently rotated by the first named element, whereby the units indicating wheel will be intermittently rotated, means for operating the other indicating wheels from the units wheel, and a speed-indicating wheel separate from the mileage-indicating wheels and connected to and rotating with the element of said gearing which is positively geared to said shaft section, said casing having two sight openings so situated that the mileage-indicating wheels are visible through one and the speed-indicating wheel is visible through the other.

2. In a ship's log, the combination with a casing, of a shaft section journaled therein and projecting beyond the same, mileage-indicating wheels journaled in the casing, gearing connecting said wheels to the shaft section, an electric lamp situated within the casing for illuminating the latter, a battery for the lamp, a switch by which the lamp circuit can be closed and a rotor connected to the projecting end of said shaft.

3. In a ship's log, the combination with a casing, of a shaft section journaled therein and projecting beyond the same, a speed-indicating wheel journaled in the casing, gearing connecting said wheels to the shaft section, an electric lamp situated within the casing for illuminating the latter, a battery for the lamp, a switch by which the lamp circuit can be closed, and a rotor connected to the projecting end of said shaft.

In testimony whereof, I have signed my name to this specification.

JOHN F. COLE.

Copies of this patent may be obtained for five cents each, by addressing the "Commissioner of Patents, Washington, D. C."